Figure 1:
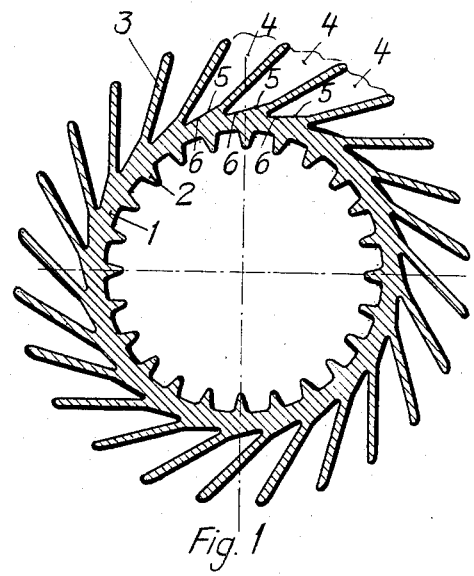

April 11, 1961  A. E. EKELUND  2,978,797
TUBULAR FINNED METAL SECTIONS AND MANUFACTURE THEREOF
Filed Feb. 21, 1955

United States Patent Office 2,978,797
Patented Apr. 11, 1961

2,978,797
TUBULAR FINNED METAL SECTIONS AND MANUFACTURE THEREOF

Anders Einar Ekelund, Vasteras, Sweden, assignor to Aktiebolaget Svenska Metallverken, Vasteras, Sweden, a limited joint-stock company of Sweden Filed Feb. 21, 1955, Ser. No. 489,631

Claims priority, application Sweden Feb. 22, 1954

2 Claims. (Cl. 29—157.3)

The present invention relates to a method for the manufacture of tubular sections of metal provided with turned-down fins preferably for heat exchange purposes and to an article produced according to said method.

In order to obtain an optimum heat transfer contact between flanges or fins and pipes, e.g. heat exchangers, it has been suggested previously to extrude said fins at the same time as the tubular sections, so that the fins will form an integral part of the tubular section. In certain cases, e.g. in the attempt to save space or for obtaining thin, "veil-like" passages having an equal cross section between the fins it has been suggested to turn or bend down the fins from their normal radial extensions so that they are brought to cover each other in a leaf-like way in an essentially tangential direction. In such connection certain deficiencies have resulted, from which it may be mentioned e.g. that the fins upon being bent over are subjected in their root section on one hand to a certain compression which is unfit from a heat transfer point of view and on the other hand to stresses which may turn out to be hazardous from a tenacity point of view with regard to the internal molecular connection of the maerial which latter has to be stretched considerably in said section. Furthermore it is nearly impossible to obtain the above "veil-like" passages of a nature being quite equal throughout due to the fact that bending at the root of the fin cannot suitably be made too abruptly and therefore a thicker section will result at this point.

Of course, it would be an advantage to provide for producing such finned pipe-like members having turned-down fins by means of metal extrusion in one stage. Such a method, however, is impossible in view of the requirements from a tenacity point of view as well as from a heat transfer and cooling aspect which have to be put to such parts of the matrice which shall be entered between such possibly extruded turned-down fins and therefore said entering parts of the matrice should of necessity be made with a relatively great width so that its cross section is able to resist stresses during the extrusion process simultaneously distributing the heat generated during the operation in a way which is safe to the matrice.

The invention which amongst others has for its object to remove the above deficiencies is mainly characterized therein that the fins are extruded simultaneously with the pipe in such a way that the fins are directed essentially tangentially in relation to the periphery of the pipe, whereupon the fins either freely or by means of interposed intermediate parts are turned down towards said periphery so that the fins are brought to overlie each other with substantially the same final distance between opposed fin surfaces along the entire extent of the fins.

According to one embodiment of the invention the sections are extruded in such a way that each fin root will conform in its form and direction substantially with the final form and direction thereof after the turning down towards the periphery of the pipe.

The invention will now be more clearly explained with reference to an embodiment diagrammatically shown in the accompanying drawing and in connection therewith further characterizing features of the invention will be set forth.

Figure 2:
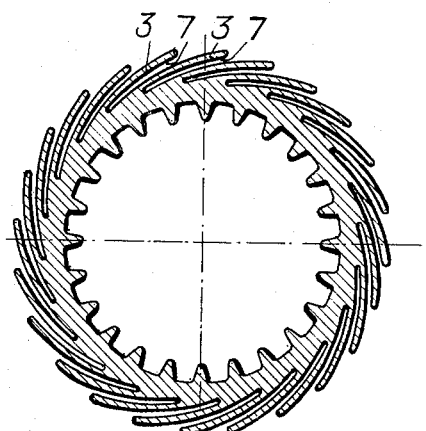

Figure 1 shows a cross section of an extruded, finned pipe-like metal section according to the invention before turning down said fins and Figure 2 shows the same section as that of Figure 1, but with the fins turned down in leaf-like covering relation to each other.

Designated by 1 is a pipe which is provided internally with inwardly extending fins or ribs 2 and externally with fins 3. As will be evident from Figure 1 the fins 3 are not directed, as is common practice, radially in relation to the pipe proper but occupy a position approximately tangential thereto. When extruding such a section the fins 3 are presumed to be pressed between lip-like matrice parts designated by 4, which of necessity should have a certain width in view of its resistance to stresses and in the resistance originated by heat as has been indicated in the preamble. As will be evident from the drawing the surfaces 5 of said matrice parts form ratchet-like formations in the extruded section, the opposite surfaces 6 of the section obtaining a nearly tangential direction to which direction the fins proper make a slight deviating angle.

After the section according to Figure 1 has been extruded it is possible in various ways, either through rolling, pressing or other similar operations, easily to turn down the fins over each other so that they will have a form substantially coinciding with that of Figure 2 where the fins have additionally been given a certain arch form. As will be evident from Figure 2 between the fins 3 there is obtained an extraordinarily smooth and equal cross section in the spaces 7 formed between the fins 3, which among other things, from a heat transfer point of view is desirable in order to obtain an equal flow through the entire cross section and thus an equal heat transfer.

The advantage of the new method thus resides therein that the fins from the beginning as far as possible in view of the way of manufacture are bent down at a maximum so that merely a small angle of bending will be required in turning down the fin. This involves less difficulty upon the bending, less compression in the root of the fin and reduced stresses in view of the tenacity.

The invention of course includes modifications of the arrangement shown in which the pipe has a shape or cross section deviating from the strict circular form. Furthermore the invention also covers such an alternative in which also the internal fins are turned down in a similar way. Furthermore the method is not restricted merely to heat exchangers.

The fins may possibly be turned down so far that their top edges will contact underlying edges, so that separated spaces are formed between the fins. The most important fact is that the flow passages provide the desired "veil-form."

The invention is not limited to the embodiment shown and described but may be varied in many ways within the scope of the basic inventive idea.

Having now described the invention, what I claim as new and desire to secure by Letters Patent is:

1. The method of making a finned metal tube suitable for heat exchanging purposes which comprises initially extruding a metal blank having a tubular core portion and a plurality of external longitudinally extending fins projecting substantially tangentially from said core portion, the configuration of the blank as extruded being such that the envelope of the external surface of the peripherally continuous core portion alone of the blank presents a ratchet-like configuration comprising a series of substantially flat tangential surfaces which at their radially inner edges coincide with the circle defining the outer surface of the wall of said tubular core portion at the places of minimum radial thickness of said wall and which substantially flat tangential surfaces at their radially outer edges lie outside said circle by a distance substantially equal to the thickness of the fins and with the fins projecting in generally tangential direction beyond the aforementioned surfaces along substantially straight lines deviating slightly in radially outward direction from the surfaces from which they respectively project so that each of said fins diverges in radially outward direction from the adjacent fins on the opposite sides thereof, and thereafter bending said fins laterally from their initially extruded and radially divergent positions into final positions in which adjacent fins are brought into at least non-divergent relationship to each other.

2. The method as defined in claim 1 in which the fins are bent to curved configuration with the root portions constituting smoothly extending continuations of the aforesaid surfaces constituting a part of the core portion of the element, whereby the fins are brought into substantial parallelism providing slots of substantially equal width from root to tip between adjacent fins.

References Cited in the file of this patent

UNITED STATES PATENTS

| | | |
|---|---|---|
| 1,772,780 | Milone | Aug. 12, 1930 |
| 2,247,243 | Kritzer | June 24, 1941 |
| 2,281,207 | Schoen | Apr. 28, 1942 |
| 2,289,984 | Mouromtseff | July 14, 1942 |
| 2,401,542 | Booth | June 4, 1946 |
| 2,463,997 | Rodgers | Mar. 8, 1949 |

FOREIGN PATENTS

| | | |
|---|---|---|
| 502,657 | Belgium | May 15, 1951 |